United States Patent
Becker et al.

(10) Patent No.: US 7,900,098 B2
(45) Date of Patent: *Mar. 1, 2011

(54) RECEIVER FOR RECOVERING AND RETIMING ELECTROMAGNETICALLY COUPLED DATA

(75) Inventors: Matthew Becker, Harvard, MA (US); Zibing Yang, Natick, MA (US); Qiang Zhang, Northborough, MA (US); Todd Hinck, Arlington, MA (US); Larry Tate, Hopkinton, MA (US)

(73) Assignee: Intel Corporation, Santa Clara, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/080,262

(22) Filed: Apr. 1, 2008

(65) Prior Publication Data

US 2009/0243638 A1   Oct. 1, 2009

(51) Int. Cl.
G06F 11/00 (2006.01)
G01R 31/28 (2006.01)
G01R 11/30 (2006.01)
G01R 31/02 (2006.01)
G01R 19/00 (2006.01)
G01R 23/02 (2006.01)
G01R 23/14 (2006.01)
G01R 25/00 (2006.01)
H03K 3/00 (2006.01)

(52) U.S. Cl. .................. 714/708; 714/712; 714/715; 327/181; 324/144; 324/76.11; 324/76.39; 324/76.41; 324/76.77; 324/76.82; 324/537

(58) Field of Classification Search .............. 714/712, 714/715, 708; 327/181; 324/144, 76.11, 324/76.39, 76.41, 76.77, 76.82, 537
See application file for complete search history.

(56) References Cited

U.S. PATENT DOCUMENTS

| | | | |
|---|---|---|---|
| 6,009,488 A | 12/1999 | Kavipurapu | 710/105 |
| 6,573,801 B1 * | 6/2003 | Benham et al. | 333/24 R |
| 6,611,181 B2 * | 8/2003 | Marketkar et al. | 333/24 R |
| 6,625,682 B1 * | 9/2003 | Simon et al. | 710/305 |
| 7,075,996 B2 * | 7/2006 | Simon et al. | 375/259 |
| 7,076,177 B1 * | 7/2006 | Yang et al. | 398/208 |
| 7,080,186 B2 * | 7/2006 | Simon et al. | 710/305 |
| 7,365,532 B2 * | 4/2008 | Hinck et al. | 324/213 |
| 7,373,561 B2 * | 5/2008 | Baumer et al. | 714/704 |
| 7,451,365 B2 * | 11/2008 | Wang et al. | 714/712 |
| 7,605,671 B2 * | 10/2009 | Liang et al. | 333/24 R |
| 7,633,877 B2 * | 12/2009 | Sharma et al. | 370/241 |
| 2007/0236220 A1 | 10/2007 | Hinck et al. | 324/329 |
| 2008/0170610 A1 * | 7/2008 | Harper | 375/226 |
| 2009/0085697 A1 * | 4/2009 | Hinck et al. | 333/24 R |

OTHER PUBLICATIONS

Benham et al., An Alignment Insensitive Separable Electromagnetic Coupler for High-Speed Digital Multidrop Bus Application, Dec. 2003, IEEE, vol. 51, pp. 2597-2603.*

* cited by examiner

*Primary Examiner*—John J Tabone, Jr.
(74) *Attorney, Agent, or Firm*—Trop, Pruner & Hu, P.C.

(57) ABSTRACT

In one embodiment, the present invention includes a system having an electromagnetic coupler probe to electromagnetically sample signals from a device under test or a link under test and a receiver, e.g., configured as an integrated circuit that is to receive the sampled electromagnetic signals from the probe and output digital signals corresponding thereto. Other embodiments are described and claimed.

18 Claims, 5 Drawing Sheets

RECEIVER FOR RECOVERING AND RETIMING ELECTROMAGNETICALLY COUPLED DATA

BACKGROUND

For modern computer systems including semiconductor devices and buses, validation systems/tools incorporating logic/traffic trace probes are used to debug and validate new systems and boards for shipment, and also to quickly diagnose field return issues that may be design or process related or both in order to avoid costly product recalls. To support the bandwidth of ever-faster semiconductor devices such as microprocessors and so forth, the data rates on the buses that connect such devices to memory, graphics and peripherals must constantly scale to higher rates. Interactions between such devices are observed for purposes of logic validation, in order to debug the devices and ship product.

Probing of various data buses such as input/output (I/O) buses has been done using various direct-attached methodologies. Example methodologies include resistive-based probe technology connected to a logic analyzer. However, as bus speeds scale to higher data rates, such probing may cause signal integrity issues for a link under test (LUT).

DETAILED DESCRIPTION

In order to mitigate signal integrity issues when probing a device under test (DUT) and a link under test (LUT), probe technology based on an electromagnetic (EM) coupler attached to a LUT may be used. The EM couplers sample the LUT signals using "controlled" crosstalk while causing only minimal disturbance to the LUT. In turn, a receiver system, which may be a separate integrated circuit (IC) or other dedicated semiconductor device, is used to recover, enhance, and convert the sampled signals to digital form for transmission from the receiver system.

More specifically, embodiments of the present invention may provide a receiver for a direct-attached EM coupler probe (or coupler). An EM coupler probe (such as a direct-attached EM coupler probe) samples a LUT using back crosstalk coupled from signals on the LUT. The sampled signals are used to recover the digital signals that are present on the LUT. This is accomplished using an electronics receiver component (hereafter also called a receiver). The coupler probe outputs a derivative-like of the LUT signal. The LUT output signal is then recovered by integrating the signal first. An integration function is an inverse of a derivative function, so a baseband signal gets restored albeit in a scaled form. Embodiments of the present invention may provide probing for signaling validation or logical debug using an analyzing device coupled to the receiver.

Figure 1:
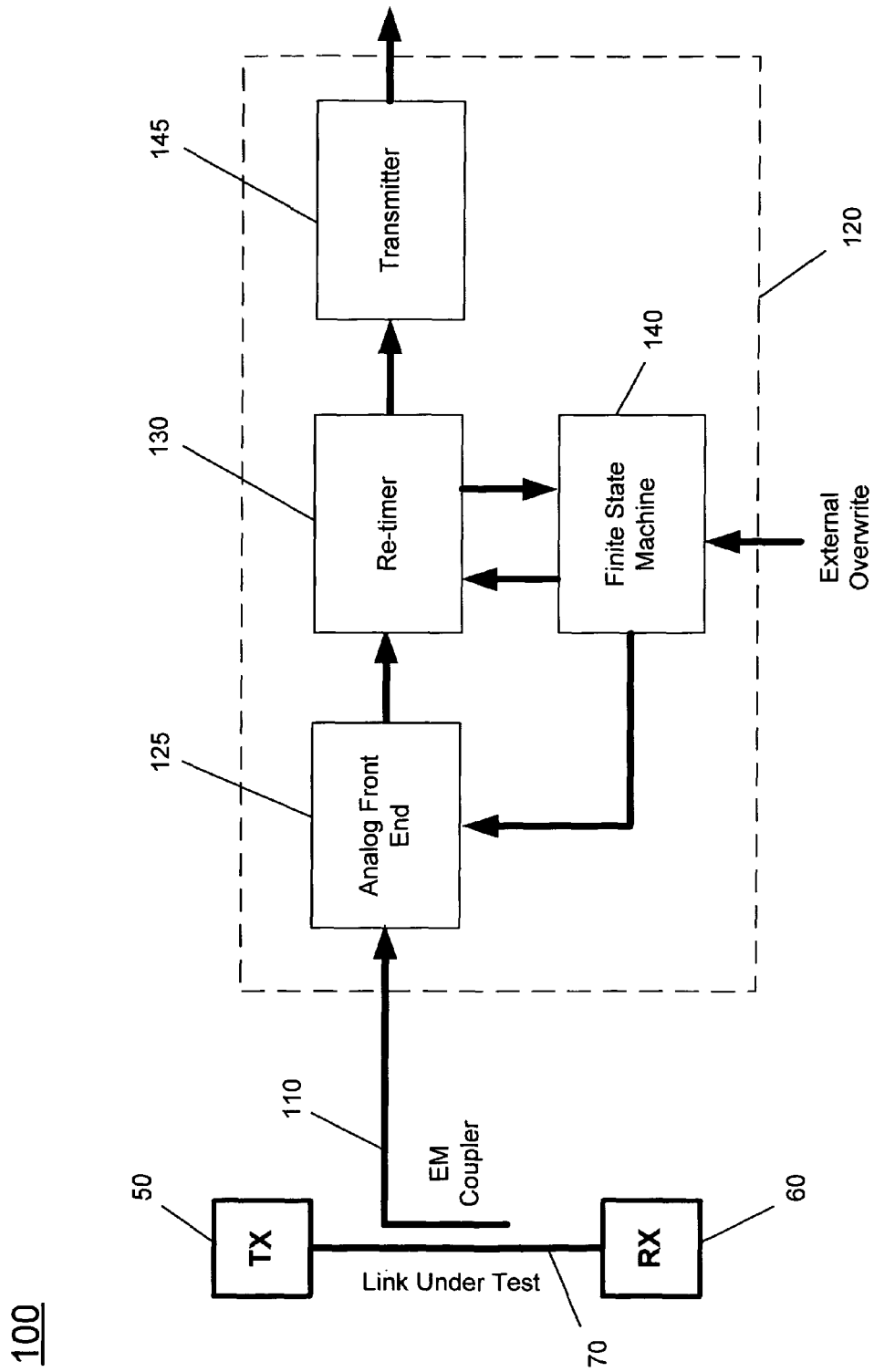
FIG. 1 is a block diagram of a data receiver electromagnetically coupled to a LUT according to an example embodiment of the present invention.

FIG. 1 is a block diagram of an electromagnetic receiver coupled to a LUT according to an example embodiment of the present invention. Other embodiments and configurations may also be used. The embodiment shown in FIG. 1 may relate to direct current (DC) balanced or non-DC balanced data transmitted on a LUT. As one example, DC balanced data may include a clock signal encoded into the data signals.

FIG. 1 shows a transmitting device 50 and a receiving device 60 connected by a LUT 70. The terminology LUT refers to at least one signal connection between the transmitting device 50 and the receiving device 60. The transmitting device 50 and the receiving device 60 may be different ICs or other semiconductor components connected by a bus, an interconnect, signal lines, printed circuit board (pcb) traces, flex cables, micro-coax, and/or other electrical connection means.

The transmitting device 50 may include processing circuitry or other such circuitry to generate data to be transmitted on the LUT 70 to the receiving device 60. The data may be differential DC encoded data. The transmitting device 50 may be provided on one chip and the receiving device 60 may be provided on another chip such that at least the LUT 70 is connected between the two chips to enable the data to be transmitted between the two chips. The data may be transmitted and/or validated during a validation process of a product (that includes at least one of the two chips), during a debugging of a product (that includes at least one of the two chips) and/or during actual use of the product (that includes at least one of the two chips).

The EM receiver 100 shown in FIG. 1 may include an EM coupler probe 110 coupled to the LUT 70 and a receiver 120 connected to the EM coupler probe 110. Receiver 120 may be connected to EM coupler probe 110 using micro-coax, printed circuit board (pcb) traces, flex cables, and/or other electrical connection means. The EM coupler probe 110 may provide sampled electromagnetic signals. As one example, the EM coupler probe 110 may include two parallel signal traces provided for each differential pair of traces of the LUT 70. The EM coupler probe 110 may be coupled to the LUT 70, such as directly coupled. Additionally, the EM coupler probe 110 may be alternating current (AC) coupled to the LUT 70 by having both inductive and capacitive coupling. As one example, the coupler probe strength, a measure of the coupled signal to the LUT signal, may be set between approximately $0.1 < K_c < 0.2$, where $K_c$ is defined as a coupling coefficient (i.e., a ratio of coupler output voltage to the LUT voltage at an input to the coupler probe) to remove approximately 1% to 4% of the LUT signal power. This may minimize LUT signal integrity impact. Other examples of the EM coupler probe 110 are also within the scope of the present invention.

The receiver 120 may receive the sampled electromagnetic signals from the EM coupler probe 110 based on the data (or data patterns) transmitted on the LUT 70. The receiver 120 may process this data to generate recovered and re-timed digital signals that can be sent to another device such as a logic analyzer, or directly analyze the data. Inputs and outputs of the receiver 120 of the EM receiver 100 may be differential. Output signals of the receiver 120 may be provided to an analyzing device to validate or invalidate the data on the LUT. The analyzing device may be an oscilloscope, logic analyzer or other apparatus to analyze the recovered data. The receiver 120 may also process the data directly. Accordingly, the receiver 120 performs signal processing on the received electromagnetic signals to allow re-timed digital data signals corresponding to the sampled signals to be validated.

In one embodiment the EM-coupled signal received from EM coupler probe 110 is first recovered and amplified by an analog front end (AFE) 125, which may include various circuitry such as integrators, amplifiers, and equalizers and droop control circuitry. From AFE 125, conditioned analog signals are provided to a re-timer 130, which converts the analog waveforms to digital bits, performs clock-to-data recovery, and retimes the incoming data stream to a different clock. In one implementation, re-timer 130 may include at least two parallel paths, one of which is a data path to generate re-timed digital data for output to transmitter 145, and a second parallel path, referred to as an error path, to provide feedback information to a finite state machine (FSM) 140 regarding various information that can be used to control a sampling clock of the data path of re-timer 130. In this implementation, each parallel path may in turn include samplers to sample the incoming analog signals at different clock phases, as controlled by FSM 140. For example, each parallel path may include a plurality of samplers, e.g., four such samplers, one of which is clocked by a corresponding sampling clock (i.e., a data sampling clock for the data path and an error sampling clock for the error path), while the other remaining samplers may be clocked by corresponding error clocks that are at different phases with respect to the sampling clock. By feeding back information regarding values sampled by each of the samplers at these different clock phases, FSM 140 may accurately control the phase of the data sampling clock such that the clock is located at a substantial midpoint of a data eye for optimal performance.

Note that the clocks that are generated to control the samplers may in turn be generated responsive to control information from FSM 140, which may provide such information to multiple phase interpolators (PIs) present in re-timer 130. As such, re-timer 130 may also include a clock control mechanism such as a phase locked loop (PLL) or a delay locked loop (DLL) to generate a clock that is provided to the phase interpolators, each of which then adjusts this clock to generate the various sampling and error clocks.

FSM 140 provides automatic training and calibration of control settings for analog front end 125 and re-timer 130. The settings can also be overwritten and monitored externally. Such overwrite control signals may be received from external hardware/software or other control interface. Finally, a transmitter 145 is connected to the output of re-timer 130 to send the digital data from receiver 120.

Embodiments can transmit the re-timed digitized bits to various locations in different embodiments. For example, in one implementation the re-timed digitized data may be transmitted to an analyzing equipment or an application specific integrated circuit (ASIC) that contains logic functions for data analyses and system debug. Alternatively, a high-speed incoming data stream can be converted to slower traffic by adding more transmitters in a receiver (e.g., multiple transmitters 145 in parallel) so that a field programmable gate array (FPGA) can be used instead of an ASIC. Note that in different embodiments, a link layer and protocol functions can be integrated into the receiver 120 or in a backend ASIC.

Figure 2:
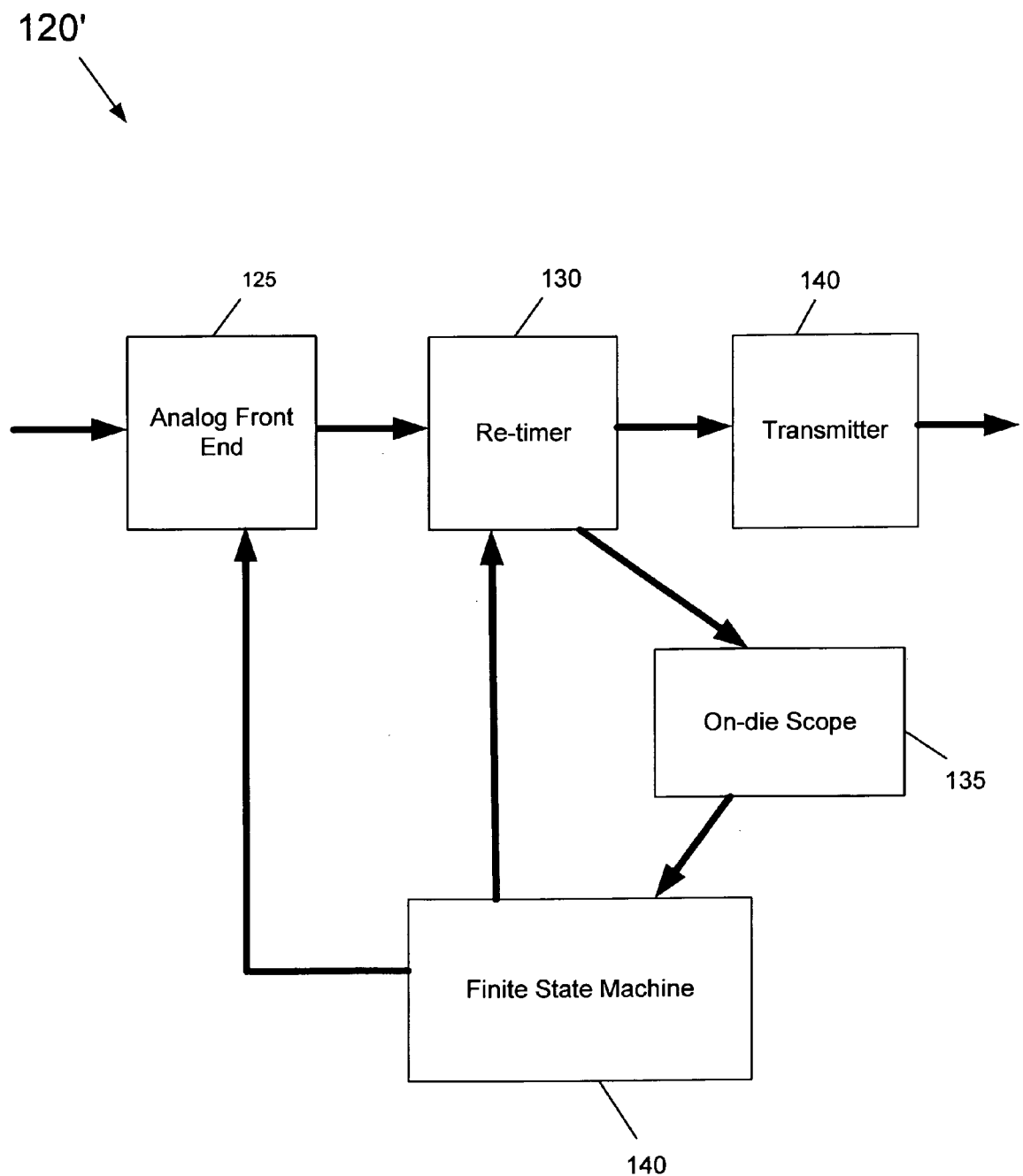
FIG. 2 is block diagram of a receiver according to another example embodiment of the present invention.

To ensure optimal performance, embodiments may further include an on-die scope to monitor eye opening of an incoming data eye, and train control settings based on the eye width. As shown in FIG. 2, receiver 120' may be arranged similarly to that of receiver 120 of FIG. 1. However, note that an on-die scope 135 may be present to determine eye opening information with regard to a data eye. As shown, on-die scope (ODS) 135 may be coupled to receive information from re-timer 130 and provide a measure of eye opening to FSM 140. In one embodiment, such eye opening information may correspond to a width of the data eye. Alternately, other eye opening information, such as eye opening amplitude, eye opening area or other data eye metric information. Such information may be provided for one or more clocks (e.g., an error sampling clock) that are also used to sample data, for feedback and training purposes.

Based on this information, FSM 140 may send control information to both AFE 125 and re-timer 130. For example, based on the information received, FSM 140 may control various analog front end components, such as an equalizer, droop control, offset control, input termination resistance, integrator and so forth. Still further, FSM 140 may provide control information to re-timer 130, for example, control information for one or more phase interpolators to thus dynamically update one or more sampling clocks used in re-timer 130.

Embodiments may perform initial calibration after power-on, as well as real-time training to compensate for time-varying factors, such as voltage, temperature, and so forth. Note that the initial training that is performed may be done using known, or unknown or non-deterministic, i.e., random incoming information. That is, for this training phase there is no need for a transmitter coupled to the LUT to transmit a known training pattern. Instead, embodiments may perform training using random information. More specifically, ODS 135 and FSM 140 may perform calibration using transitions present in the incoming data stream, rather than searching for and locking onto a known training pattern. In this way, a window can be established around where transitions of the data eye occur and to move the data sampling clock away from this window and towards a center of the data eye. For example, information provided by ODS 135 to FSM 140 may include multiple counts, each corresponding to transitions occurring in a given window associated with the eye width. Alternately, transition indications may be sent from ODS 135 to FSM 140, which can count the transitions occurring in each window. For example, three windows may be established, each of which corresponds to a portion of a unit interval (UI) between a sampling clock and an error clock. Counts may be maintained for each window and provided from ODS 135 to FSM 140. FSM 140 may analyze the multiple counts to determine the window having the fewest number of transitions, which likely corresponds to a sampling clock phase that occurs substantially at a center of the data eye. However, other implementations are possible. Note that each lane in the same receiver can be trained independently. That is, in various implementations, receiver 120 of FIG. 1 and receiver 120' of FIG. 2 may have multiple lanes or paths, each configured the same as that shown in FIGS. 1 and 2, with each path associated with a given differential lane of a LUT to which the receiver is coupled.

Figure 3:
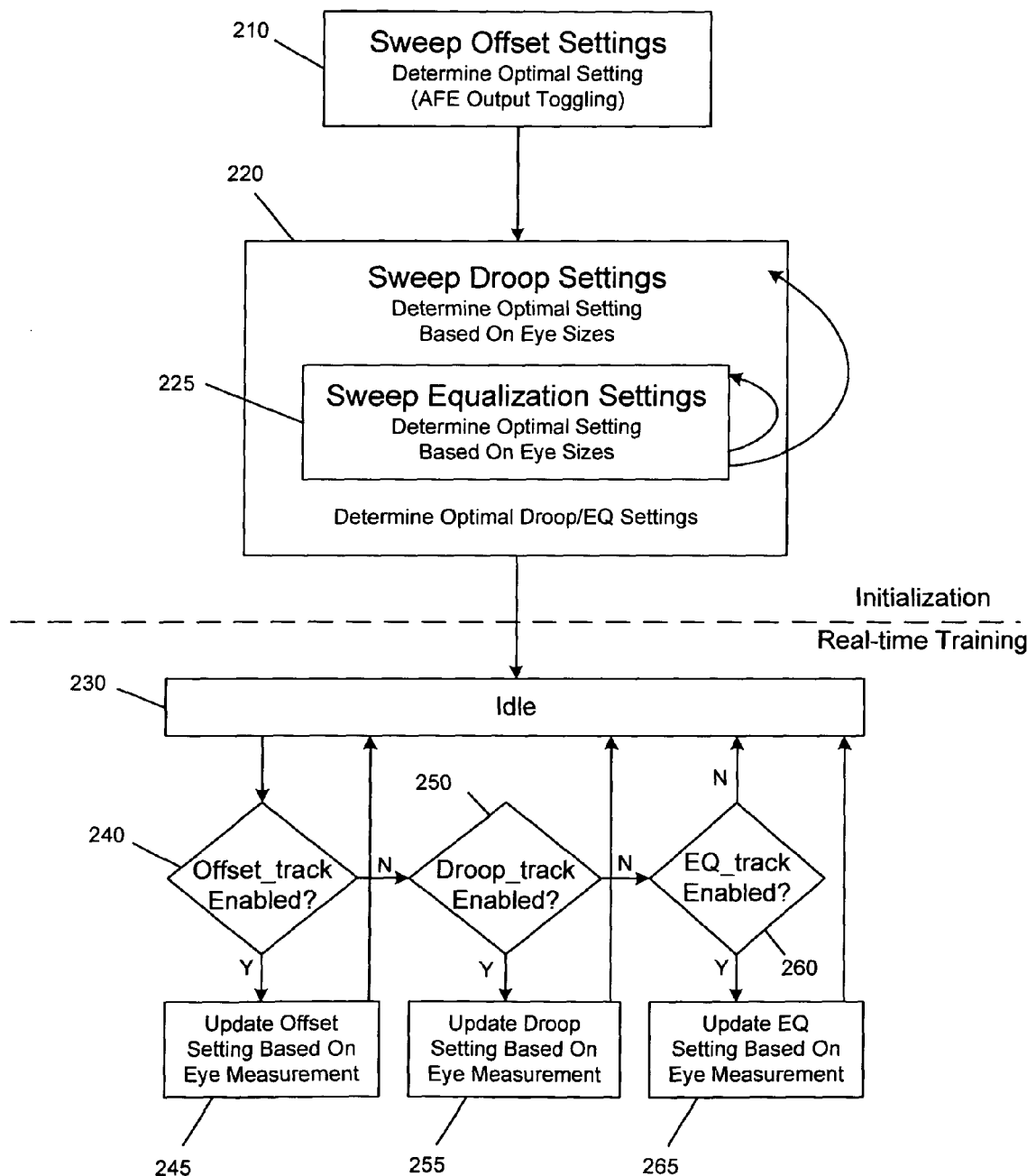
FIG. 3 is a flow diagram of training operations in accordance with one embodiment of the present invention.

Various manners of implementing training may be realized in different embodiments. Referring now to FIG. 3, shown is a flow diagram of training operations in accordance with one embodiment of the present invention. As shown in FIG. 3, process 200 may correspond to training that occurs both at initialization as well as during normal system operation to enable adaptive control of various parameters within a receiver in accordance with an embodiment of the present invention.

As shown in FIG. 3, method 200 may begin by sweeping offset settings. Such offset settings may be associated with the EM coupler channel or one or more gain stages within an analog front end of a receiver. As various offset values are provided to different components such as one or more gain stages of the analog front end during multiple cycles of incoming data, an optimal setting may be determined. More specifically, the optimum setting may occur when output data generated from the output of the AFE 125 toggles. That is, in some implementations, particularly in a differential implementation, when the values on the positive and negative signal lines toggle, this may be an indication of the optimal offset setting. Accordingly, at block 210, this offset setting may be obtained and used to provide control signals to various components of the analog front end. Note that in some implementations a feedback path of re-timer 130 (e.g., with respect to FIG. 1) may provide the data output that is analyzed to determine output toggling.

Referring still to FIG. 3, next at block 220, droop settings may be swept through a range of such settings. Using these droop settings, an optimal droop setting based on an eye size may be determined. Note that block 220 includes a nested loop in which a range of equalization settings are swept for each droop setting, at block 225. Thus at a first droop setting, a range of equalization settings are swept. Of that range of swept equalization settings, an optimal setting may be determined based on the eye size. That is, of the range of equalization settings, one such setting may provide an eye width having a greatest value. This equalization setting of the swept equalization values may be stored in a temporary storage, e.g., associated with the FSM. Control then loops back at block 220 to sweep the droop settings, e.g., to adjust the droop settings to a next set of values of a range of set timing. Again, the equalization settings may be swept at this updated droop setting, and the equalization setting associated with the widest eye width may again be determined. Such operations may be performed iteratively until all droop settings have been swept. Accordingly, at the conclusion of block 220, an optimal determination of droop/equalization settings may be set based on the given one of the multiple droop settings that has the best performance (e.g., greatest eye width). As such, these various values for the analog front end may be applied via control signals from FSM 140 to AFE 130 to enable optimal operation of receiver 120. After such training, normal receiver operation may occur, and the training method of FIG. 3 may enter into an idle stage 230.

To further provide adaptive behavior during real-time operation, additional real-time training may occur. Specifically, at given intervals, which may be controlled by a user or set by an external component, or as determined by the FSM, it may be determined whether an offset track enable has been initiated (diamond 240). If so, the offset setting may be updated. As shown in block 245, such setting may be based on the eye measurement. For example, an offset setting may be updated in a first direction and the eye width measured. If the eye width becomes greater, this updated setting for the offset control may be used. If not, the setting may be adjusted in the other direction (from the original setting) to determine whether the eye width changes to a wider width. If so, the second updated value may be applied to control the offset values. Otherwise no updating of the control value occurs. As shown in FIG. 3, from block 245 control passes back to block 230.

Referring still to FIG. 3, at a later time it may be determined whether the offset track enable has been initiated. If not, control may pass to diamond 250 to determine whether droop track updating has been enabled. If so, control passes to block 255, where the droop setting may be updated. In similar fashion to that described above with regard to block 245, the decision whether to update a droop setting may be based on an eye width measure between a current eye width value and that determined for a corresponding updated droop setting. After such updating (if performed), control passes back to block 230. Again, at a later time it may be determined whether an offset track updating, droop track updating, or equalizer track updating has been enabled. If equalizer track updating has been enabled at diamond 260, control may pass to block 265, where the equalizer setting may be updated. As with blocks 245 and 255, such equalizer updating may be based on a measure of eye width. After such updating, control passes back to block 230. While described with this particular implementation in the embodiment of FIG. 3, the scope of the present invention is not limited in this regard. For example, the training algorithm can be extended to any other control settings may be used (e.g., AFE input termination).

Embodiments thus provide for debug and testing of high-speed serial buses in-situ using non-invasive probing techniques, which lowers the cost per unit for various components such as desktop and server processors. Further, by enabling EM probe coupling, significant die area savings may be realized, as an on-die mirror-port (used as a test port) can be eliminated. Embodiments can be used to probe various bus architectures such as point-to-point interconnect technologies, a Peripheral Component Interconnect (PCI) Express™ (PCIe™) link based on the PCI Express™ Specification Base Specification version 1.1 (published Mar. 28, 2005), double data rate (DDR), and other high-data rate bus/link probing applications. Additionally, embodiments may be used to electromagnetically probe without the need for repeaters on a dual in-line memory module (DIMM) or other such device.

Improved logic probe reliability and performance at increased monitored link rates may provide for quicker debug of product to allow introduction of product to market quicker, as well as quicker debug of field returns of bug reports to ensure that bugs can be isolated and software, testing, processing or other workarounds can be identified in time to prevent costly returns and recalls.

Figure 4:
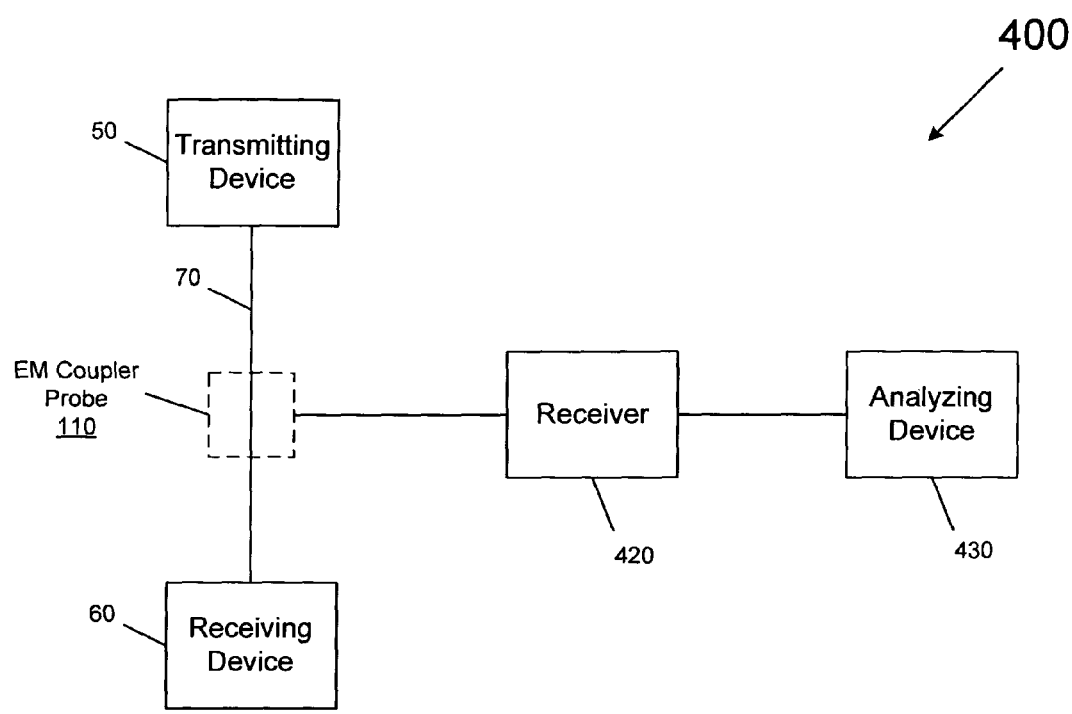
FIG. 4 is a block diagram of a system according to an example embodiment of the present invention.

FIG. 4 is a diagram of a system according to an example embodiment of the present invention. Other embodiments and configurations may also be used. More specifically, FIG. 4 shows the transmitting device 50 and the receiving device 60 connected by the LUT 70 in a similar manner as described above with respect to FIG. 1. In this example, DC balanced data signals or non-DC balanced data signals may be transmitted between the transmitting device 50 and the receiving device 60.

FIG. 4 also shows an EM receiver 400 that includes the EM coupler probe 110 coupled to the LUT 70 and a receiver 420 coupled to the EM coupler probe 110. The EM coupler probe 110 may provide sampled electromagnetic signals. The receiver 420 may receive the sampled electromagnetic signals from the EM coupler probe 110 based on the data (or data patterns) transmitted on the LUT 70. The receiver 420 may provide digitized re-timed signals, and may correspond to receiver 120 or 120 discussed above, or another receiver that provides recovered and re-timed digital signals based on electromagnetic signals received from the EM coupler probe 110.

FIG. 4 additionally shows an analyzing device 430 coupled to receiver 420 to receive the re-timed signals and to validate or invalidate such signals. The analyzing device 430 may include an oscilloscope, logic analyzer, custom hardware/software and/or firmware to analyze the digital signals. As one example, the analyzing device 430 may compare the incoming digital data against test data that corresponds to the data transmitted across the LUT 70. This test data may be appropriately stored on the analyzing device 430 in a memory device and may be provided from another source prior to be stored thereon.

Figure 5:
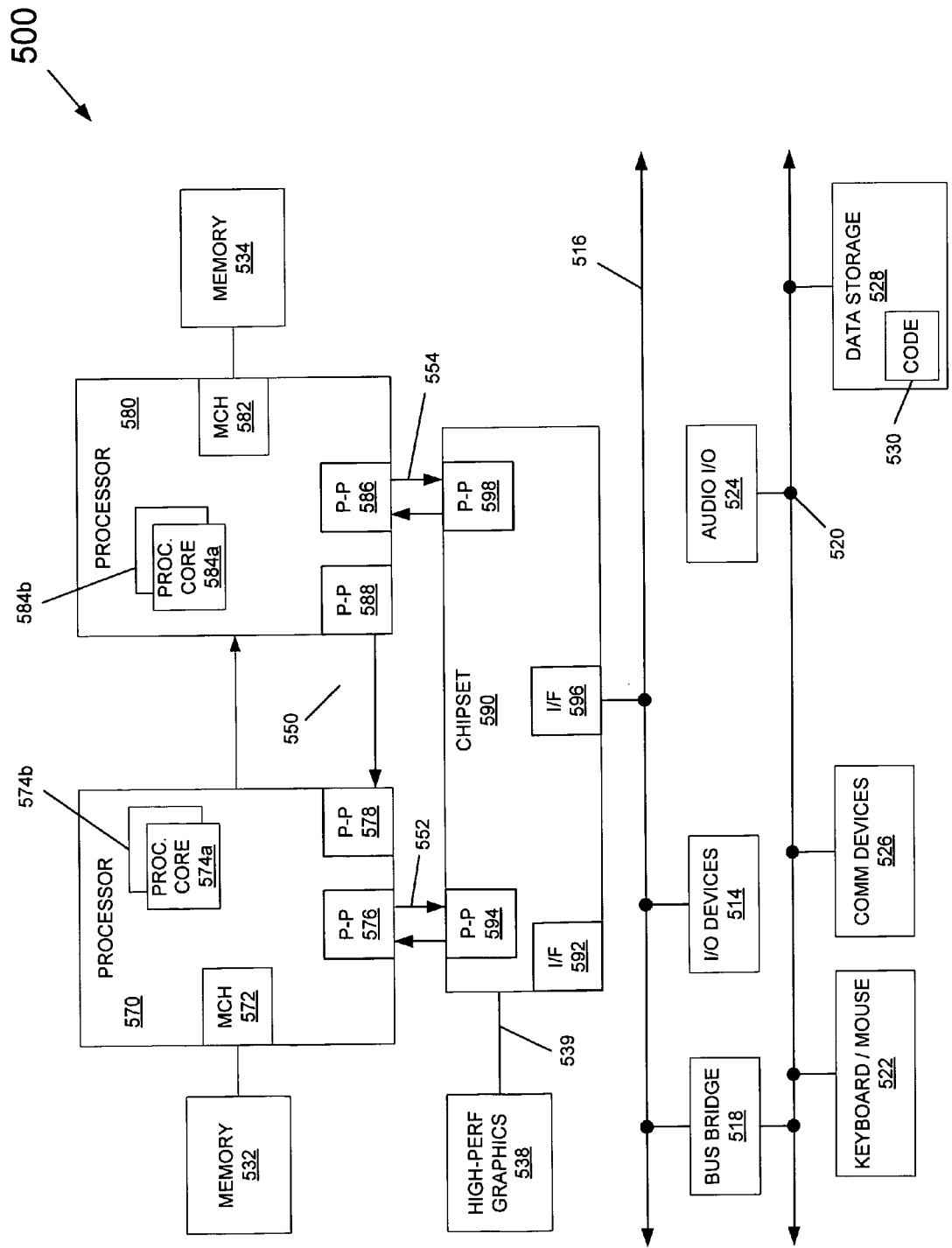
FIG. 5 is a block diagram of a system to be tested in accordance with an embodiment of the present invention.

Embodiments may be used to probe many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). As one example, interconnect 550 may be probed using an EM coupling that in turn is coupled to a receiver in accordance with an embodiment of the present invention. Note that other architectures are possible. For example, instead of the point-to-point architecture of FIG. 5, a system may implement a multi-drop bus or another such architecture.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538 via a P-P interconnect 539. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An integrated circuit comprising:
a receiver device to receive sampled electromagnetic signals from an electromagnetic coupler probe that is to electromagnetically sample signals from a device under test (DUT) or a link under test (LUT), the receiver device to output digital signals corresponding to the signals from the DUT or the LUT and including a re-timer to receive the electromagnetically sampled signals and to convert the sampled signals into the digital signals and to re-time the digital signals to a different clock.

2. The integrated circuit of claim 1, further comprising an on-die scope coupled to the re-timer to receive eye size information from the re-timer and to provide an eye size measure to a finite state machine (FSM).

3. The integrated circuit of claim 2, wherein the FSM is to control a phase of a sampling clock of the re-timer responsive to feedback information from the on-die scope.

4. The integrated circuit of claim 1, further comprising a transmitter coupled to the re-timer to condition the digital signals for transmission to a logic analyzer or an analyzing application specific integrated circuit (ASIC) attached to the receiver device.

5. The integrated circuit of claim 1, wherein the integrated circuit further includes an analog front end to receive the electromagnetically sampled signals and to condition the sampled signals, wherein an output of the analog front end is connected to an input of the re-timer.

6. The integrated circuit of claim 5, wherein the FSM is to perform adaptive control of the analog front end during a training phase in which non-deterministic data transmitted on the LUT is provided from the electromagnetic coupler probe to the receiver device.

7. The integrated circuit of claim 6, wherein the FSM is to determine an optimal a location for a sampling clock based at least in part on the non-deterministic data.

8. A method comprising:
receiving non-deterministic data from an electromagnetic probe coupled to a link under test (LUT) in a receiver circuit coupled to the electromagnetic probe;
adjusting at least one first control setting of an analog front end (AFE) of the receiver circuit until an output signal from the AFE toggles;
adjusting at least one second control setting for a first plurality of iterations and determining a size of a data eye corresponding to the non-deterministic data at each iteration;
setting the at least one first control setting corresponding to the setting when the output signal toggles and setting the at least one second control setting based on the determined data eye sizes to complete a training phase for the receiver circuit; and
adaptively updating at least one of the first and second control settings during testing operations on the LUT.

9. The method of claim 8, further comprising adjusting at least one third control setting for a second plurality of iterations at each of the first plurality of iterations.

10. The method of claim 9, wherein the first, the second, and the third control settings include an offset setting, a droop setting, and an equalization setting, respectively.

11. The method of claim 8, further comprising determining the data eye size in an on-die scope of the receiver circuit, wherein the receiver circuit is an integrated circuit coupled to the electromagnetic probe.

12. The method of claim 11, further comprising receiving the data eye size in a state machine from the on-die scope and controlling a sampling clock of a re-timer of the receiver circuit based at least in part on the data eye size.

13. The method of claim 12, further comprising sampling the non-deterministic data in the re-timer responsive to the sampling clock and transmitting digital signals from the receiver circuit corresponding to the non-deterministic data.

14. A system comprising:
an electromagnetic coupler probe to electromagnetically sample signals from a device under test (DUT); and
a receiver device coupled to the electromagnetic coupler probe to receive the sampled electromagnetic signals from the electromagnetic coupler probe and to output digital signals corresponding to the sampled electromagnetic signals, the receiver device including a re-timer to receive the sampled electromagnetic signals and to convert the sampled electromagnetic signals into the digital signals and to re-time the digital signals to a different clock.

15. The system of claim 14, further comprising an on-die scope coupled to the re-timer to receive eye width information from the re-timer and to provide an eye width measure to a finite state machine (FSM).

16. The system of claim 15, wherein the receiver device is an integrated circuit further including an analog front end to receive the sampled electromagnetic signals and to condition the sampled electromagnetic signals, an output of the analog front end coupled to an input of the re-timer.

17. The system of claim 16, wherein the FSM is to perform adaptive control of the re-timer during a training phase in which non-deterministic data transmitted on the DUT is provided from the electromagnetic coupler probe to the receiver device.

18. The system of claim 17, wherein the FSM is to perform the adaptive control during normal test operations to update at least one setting determined during the training phase.

* * * * *

UNITED STATES PATENT AND TRADEMARK OFFICE
CERTIFICATE OF CORRECTION

| | |
|---|---|
| PATENT NO. | : 7,900,098 B2 |
| APPLICATION NO. | : 12/080262 |
| DATED | : March 1, 2011 |
| INVENTOR(S) | : Matthew Becker et al. |

It is certified that error appears in the above-identified patent and that said Letters Patent is hereby corrected as shown below:

Column 8:
Line 24, "determine an optimal a location" should be --determine a location--.

Signed and Sealed this
Tenth Day of May, 2011

David J. Kappos
*Director of the United States Patent and Trademark Office*